C. GITZENDANNER.
BOOK OR PAMPHLET MAKING MACHINE.
APPLICATION FILED FEB. 28, 1912.
1,092,439.
Patented Apr. 7, 1914.
5 SHEETS—SHEET 1.
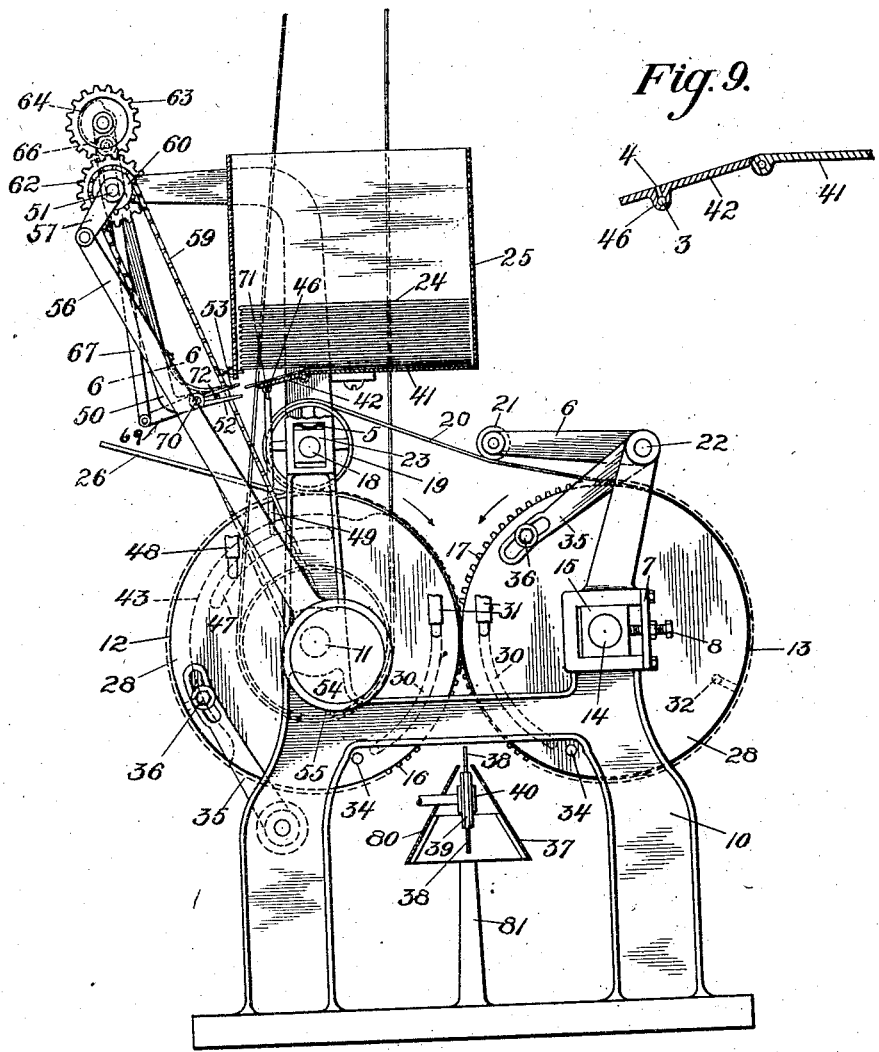

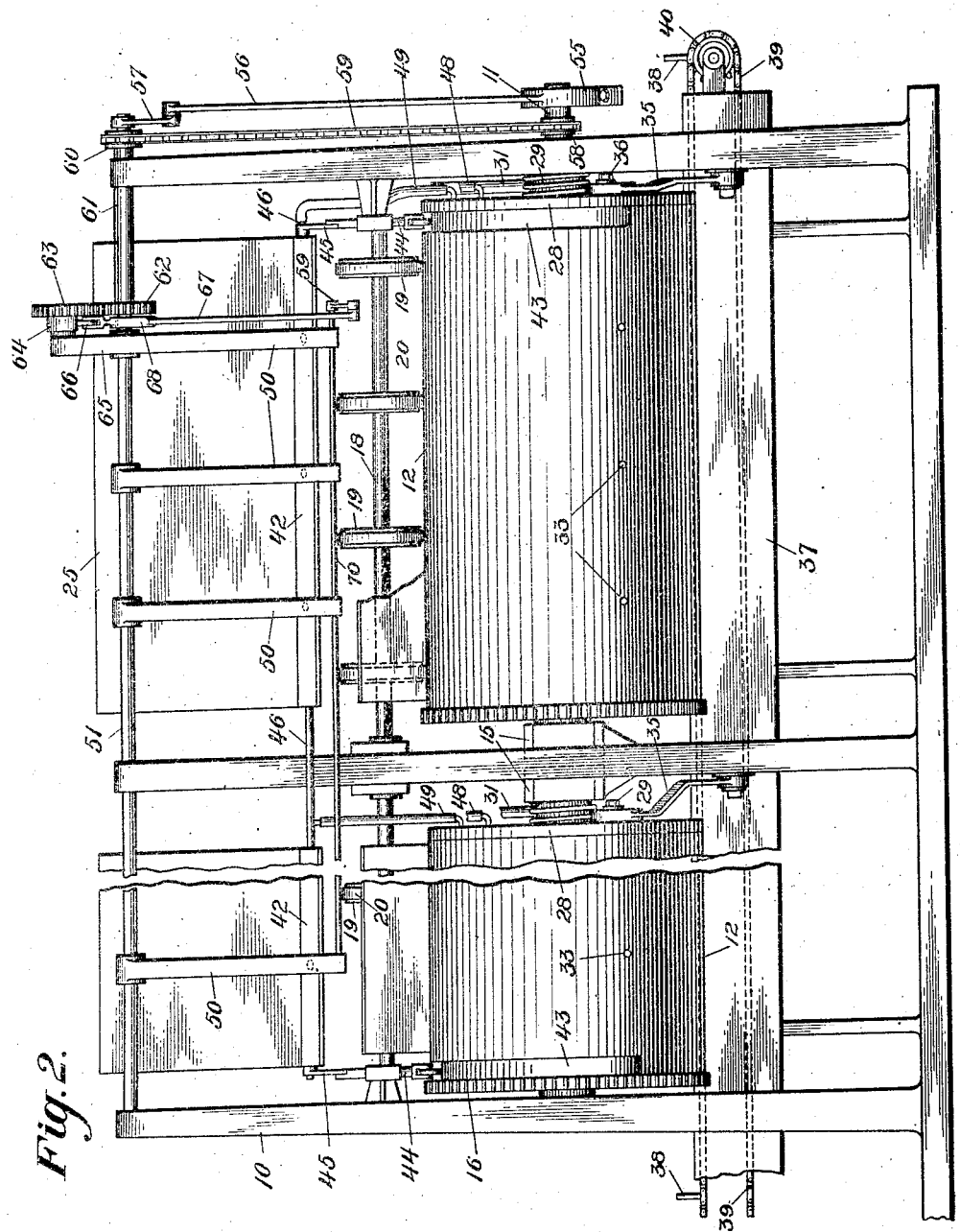

C. GITZENDANNER.
BOOK OR PAMPHLET MAKING MACHINE.
APPLICATION FILED FEB. 28, 1912.
1,092,439.
Patented Apr. 7, 1914.
5 SHEETS—SHEET 3.
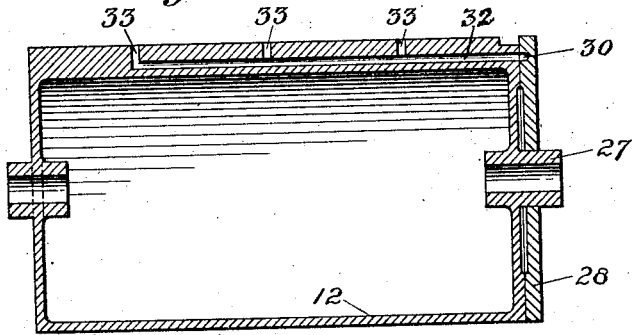
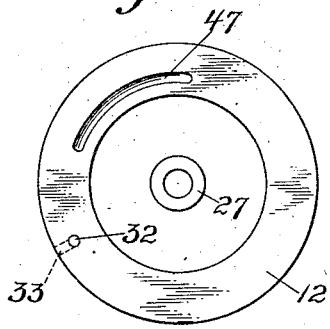
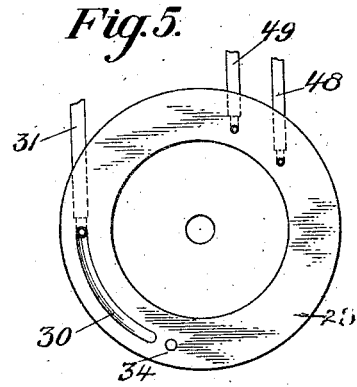
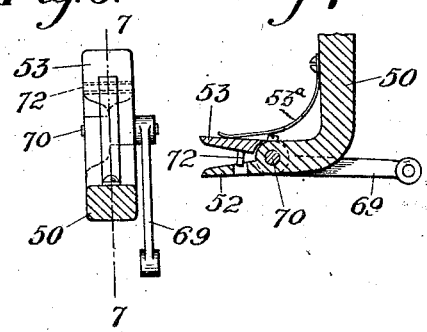
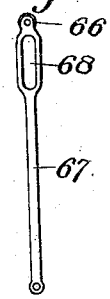
Witnesses:
John Darby
R. Menk
Charles Gitzendanner Inventor
By his Attorney John D. Morgan

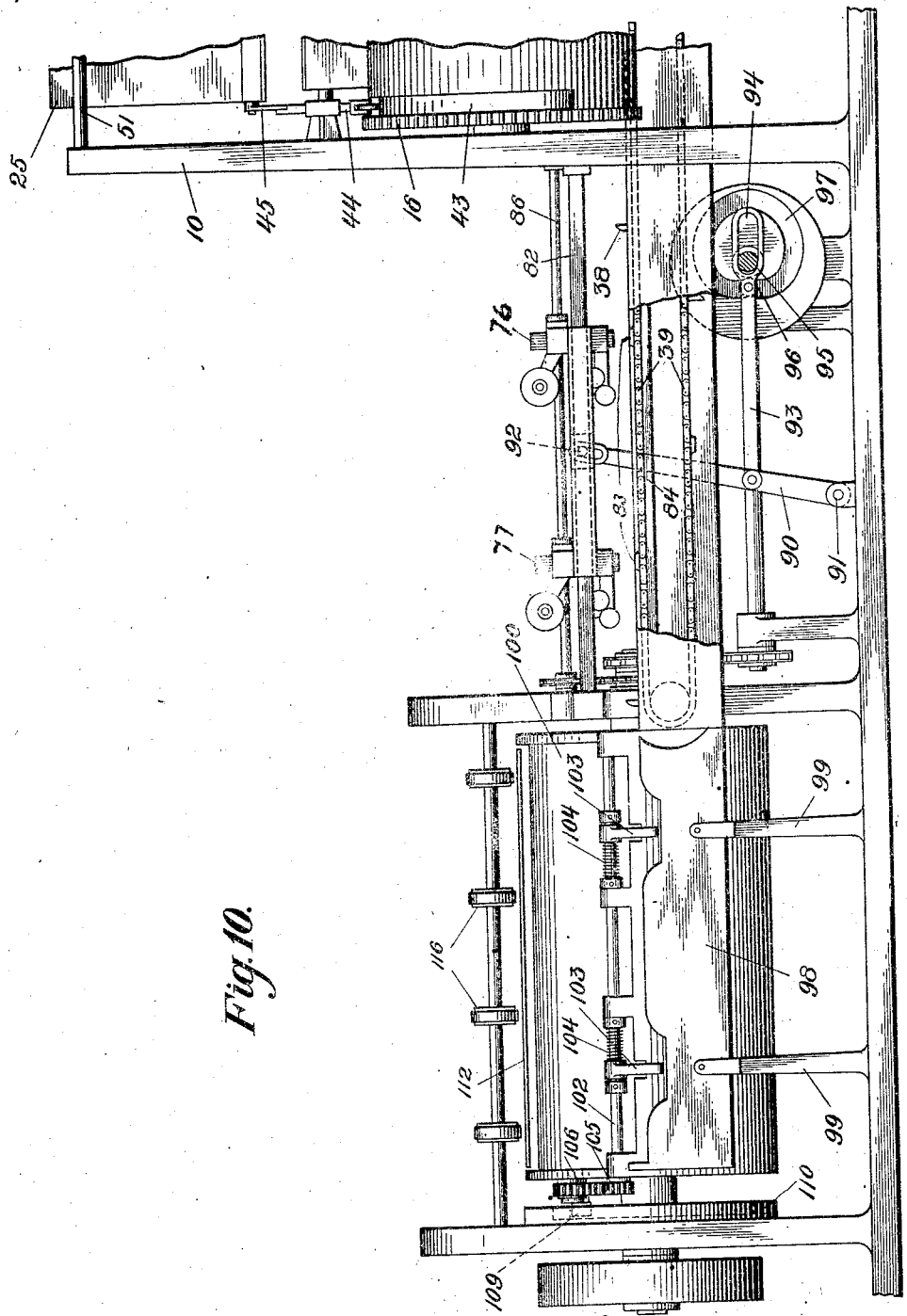

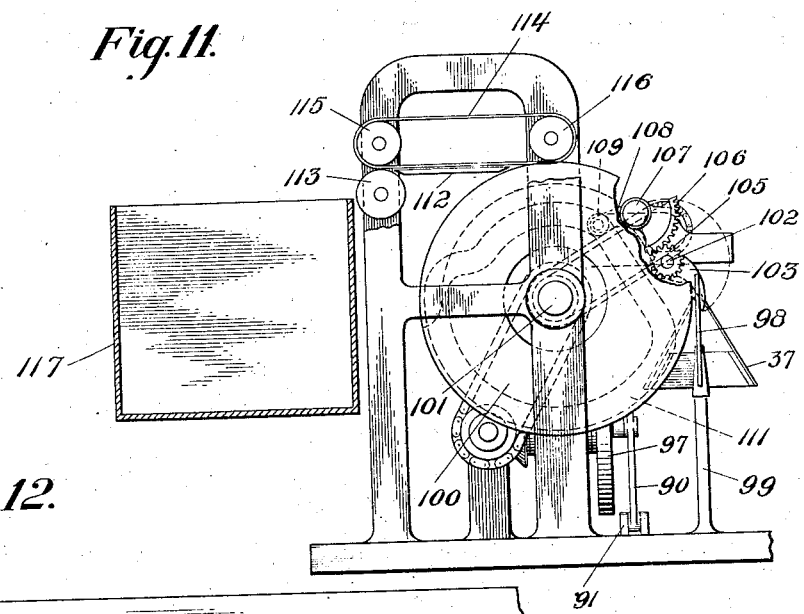

UNITED STATES PATENT OFFICE.

CHARLES GITZENDANNER, OF NEW YORK, N. Y., ASSIGNOR, BY DIRECT AND MESNE ASSIGNMENTS, TO KAST INSETTING AND GATHERING MACHINE COMPANY, A CORPORATION OF DELAWARE.

BOOK OR PAMPHLET MAKING MACHINE.

1,092,439.  Specification of Letters Patent.  Patented Apr. 7, 1914.

Application filed February 28, 1912. Serial No. 680,506.

*To all whom it may concern:*

Be it known that I, CHARLES GITZENDANNER, a citizen of the United States, and a resident of New York city, in the county of New York and State of New York, have invented new and useful Improvements in Book or Pamphlet Making Machines, of which the following is a specification.

The invention relates to machines for insetting signatures and stitching together such inset signatures to make a book or pamphlet.

One object of the present invention is to stitch together the inset and partly open signatures as they move through the machine without stopping the machine or the signatures and then delivering them out of the machine so that its operation is continuous and speedy.

Other objects of invention will in part appear hereinafter and will in part be obvious herefrom.

The invention consists in the novel parts, arrangements, constructions, combinations and improvements, herein shown and described.

The accompanying drawings, referred to herein and forming a part hereof, illustrate one embodiment of the invention, the same serving in connection with the description herein to explain the principles of the invention.

Of the drawings: Figure 1 is an end elevation of a machine embodying the principles of the invention (the signature holder being shown in section); Fig. 2 is a side elevation looking at Fig. 1 from the left; Fig. 3 is a longitudinal section through one of the opening cylinders; Fig. 4 is an end elevation of one of said cylinders; Fig. 5 is an elevation of the suction controlling head shown in section at the right hand end of Fig. 3; Fig. 6 is a section, an an enlarged scale, on the line 6—6 of Fig. 1, looking downwardly; Fig. 7 is a central section on the line 7—7 of Fig. 6; Fig. 8 is a detail of the gripper actuating rod; Fig. 9 is a central section on an enlarged scale, through the suction gate at the bottom of the magazine holder; Fig. 10 is an elevation joining on to the left hand end of Fig. 2 and showing the traveling stitchers and the delivery devices; Fig. 11 shows an elevation looking at Fig. 10 from the left, and shows the delivery cylinder which takes the stitched and folded pamphlet from the saddle and delivers them; and Fig. 12 is a fragmentary plan of the traveling stitching mechanism and associated parts shown in Fig. 10.

Referring to the accompanying drawings, illustrating by way of example one embodiment of the invention, the form of signature opening means comprises opposed rotary members between which the signature passes, said members taking hold of the sides of the signature, their subsequent movement relatively to each other serving to open the signature and, upon their releasing the signature, to deliver it in the open position. The embodied form of such means comprises a cylinder 12, shown horizontally arranged and carried by a shaft 11 journaled in the frame 10 of the machine. Opposed to the cylinder 12 is a cylinder 13, likewise horizontally arranged and carried on a shaft 14 journaled in boxes 15 slidably mounted in the frame 10. Suitable means are provided for adjusting the box 15 to govern the position of the cylinders 12 and 13 relatively to each other, in order to work to the best advantage with signatures of different pagings and thicknesses. For this purpose adjusting screws 8 are threaded into the web 7 on the frame and connect with the box 15. The cylinders 12 and 13 rotate together and for this purpose a gear 16 on the cylinder 12 intermeshes with the gear 17 on the cylinder 13, the drum traveling in the direction of the arrows in Fig. 1.

The embodied form of means for holding one side of a signature to one of the cylinders 12 and 13 and the other side thereof to the other cylinder as the signature is fed thereto operates pneumatically, although this is immaterial so far as concerns certain features of the invention. The form of such means herein shown comprises a series of suction orifices 33 arranged in a longitudinal series in the surface of each of the cylinders 12 and 13. Said orifices connect with a duct 32 leading to one of the heads of the cylinder (see Figs. 3 and 4). Against this head of the cylinder rests the disk 28, said disk resting on the cylinder hub 27. The cylinder head and disk are shaped to provide a space therebetween, as will be understood from Figs. 3, 4 and 5. The surfaces of the cylinder head and disk are machined to fit closely and air tight together, a spring 29 coiled about the cylinder shaft serves to press the head 28 and the cylinder head closely together. In said annular surface of the disk or head 28 is formed a groove 30 concentric with the cylinder and disk. Said groove 30 has at one end an orifice extending through the head 28 and connecting on the outside with a tube 31 leading to a suitable source of suction. Adjacent to the other end of the groove 30 is an orifice 34 passing through the head 28 and communicating with the external atmosphere. The heads 28 are sleeved upon the hubs 26 of their respective cylinders, but are held against rotation in a suitable manner. In the present instance arms 35 are pivotally mounted upon the machine frame, said arms being provided at their other end with slots. A clamping bolt 36 passes through each of said slots and is threaded into the respective head 28. This serves to hold the head 28 from rotation while permitting adjustment of the groove 30 and orifice 34 with respect to the duct 32 to control the timing and duration of the suction and the timing of the release of the signature. The operation of the said suction devices is substantially as follows: During the rotation of the cylinder the duct 32 comes into register with one end of the groove 30, the suction through the tube 31 then creating a suction through the orifices 33 to draw the signature against the surface of the cylinder. As long as the duct 32 travels along the groove 30 said suction continues. But when the duct 32 registers with the orifice 34, the suction ceases and the signature is released from the surface of the cylinder.

Means for supplying the signatures to the opening devices are provided, and in accordance with certain features of the invention the signatures are supplied with the front edge or the edge opposite the fold foremost. As is well known, a folded and uncut signature, by reason of the folding over at the top or bottom ends opens only at the middle. In other words, at the back it is folded into one, and at the top or bottom edge it is folded into two parts. By the term open edge as used herein, is meant the front edge, that is, the edge opposite the folded back, and at which edge the signature opens into two halves.

In the embodied form of such signature supplying means an inclined table 26 is arranged above the cylinder 12, having its lower edge closely contiguous to said cylinder. Adjacent to said lower edge of said table 26 are a series of rolls 19 fixed to a shaft 18, said shaft 18 being journaled in boxes 23 slidably mounted in the machine frame. Running over rolls 19 are belts or tapes 20 which run between the rollers 19 and the cylinder 12, pass along the surface of said cylinder and between it and the cylinder 13, then about the cylinder 13 and back to the rollers 19. A series of rollers 21 are carried on arms 6 fixed to the shaft 22, said shaft being acted on by suitable springs (not shown) to press on the tapes or belts 20 to keep them in tension. Springs 5 are arranged to act between the machine frame and the sliding boxes 23 to press the rollers 19 and the tapes 20 against the surface of the cylinder 12. It will thus be seen that the belts 20 travel at the same speed as the surface speed of the cylinders 12 and 13, and that the signatures will be received and carried between the belts and the cylinder 12, but that at the point where the belts pass to the cylinder 13, the signatures will be released therefrom, each half of the signature moving with the cylinder to which it is attached to open the signature.

In the operation of the machine described, it will be understood that if the signatures be placed upon the table 26 with their front or open edge forward, they will be carried between the cylinder 12 and the tapes 20. As it approaches the contact point of the two cylinders, the suction devices operate to engage or hold the opposite side of the signature to each of said cylinders respectively. The parts are so timed that the suction orifices will engage the signature preferably close to said open edge. As the two cylinders continue to rotate, the points where the opposite sides of the signature are engaged will separate from each other, thus opening out the signature. When the suction ceases, the signature will be released and will be delivered open to the next succeeding mechanism. In this embodiment it will be further delivered with the opened edge of the signature foremost. With the horizontally arranged cylinders, the signature will also be delivered downwardly and in position to be dropped open upon a suitable support. Means are provided in accordance with one feature of the invention for receiving and keeping such opened signature open, said means in the present embodiment being located below and centrally of the two drums to receive the signatures as they are dropped. In the embodied form said means comprise a saddle having two supporting members 37 and 80 extending horizontally and having their upper edges closely adjacent to each other and their lower edges more widely separated, so as to support a signature or signatures in a partly open position. Said members are mounted upon supports 81 fixed to the machine frame.

The invention in one of its features provides for a plurality of the signature opening devices arranged in a series for insetting the signature opened by each of said devices with the signatures opened by the other devices. The invention, in one aspect thereof, provides further for progressing the open signatures past successive opening devices in order that the signatures opened by each of said devices may be associated and inset with the others. The form of such progressing means shown herein comprises pins or fingers 38 traveling in the slot between the upper edges of the members 37 and 80. Said fingers are carried upon a sprocket chain 39 traveling over a sprocket wheel 40 at one end and over a similar sprocket wheel (not shown) at the other end. Suitable driving means for said chain will also be provided. It will thus be understood that the open signatures are kept open and are progressed along the members 37 and 80. As they pass each of the signature opening devices, another signature opened by such other opening device is dropped thereon, the signatures then being conveyed away so associated, inset and open, to be operated upon by the next succeeding mechanism.

Suitable means for supplying the signatures automatically to each of the signature opening devices may be provided. The embodied form of such means comprises a signature holder 25 for each of the signature opening devices arranged above said opening devices. Swinging grippers, hereafter more fully described, withdraw the signatures one at a time from the signature holder and deposit said signatures upon the corresponding feed board 26 and in operative relation with the tapes 20, and with the front edge of each signature forward. The bottom 41 of said holder 25 has pivoted thereto a gate 42 provided with a series of suction orifices 4 communicating with a duct 3 in suction pipe 46. The gate 42 is actuated by suitable means to rock it against the bottom signature and then draw the signature away with the gate. The embodied form of such actuating means comprises a cam groove 43 in the cylinder 12 in which groove runs a cam roll on the reciprocating rod 44 (see Fig. 2). Said rod 44 is pivoted to a lug 45 on the suction pipe 46. Said duct 3 connects by a tube 49 with an orifice passing through the head 28, which is mounted in coöperation with the head of the cylinder 12 as shown in Fig. 3. Adjacent to said orifice is a second orifice connecting with a tube 48, said tube connecting in turn to a suitable source of suction (see Figs. 4 and 5). In the correspondingly annular surface of the cylinder head is a groove 47 which registers in passing with said orifices in the head 28. It will be understood that when the groove 47 passes the orifices, as the cylinder 12 rotates (the head 28 being stationary) it will establish communication for a brief time between said orifices and produce suction at the orifices 4 of the gate 42. This action will occur on each revolution of the cylinder. The gate 42 is thus swung against the bottom signature of the stack 24 and is then swung away with the signature adherent thereto by reason of the suction of the orifices 4. Said gate is proportioned so that the edge of the signature projects beyond it in position to be gripped by a suitable sheet taking mechanism.

The form of signature-taking mechanism herein shown comprises a fixed jaw 52 carried upon an arm 50 fixed to a shaft 51 journaled in the machine frame. Fixed to the end of the shaft 51 is a crank arm 57 to which is pivoted a link 56. The other end of the link 56 terminates in a strap 55 of an eccentric 54 on the shaft 11. Pivoted to the fixed jaw 52 at 70 is shown a movable jaw 53 to which is fixed a backwardly extending arm 69. Pivoted to the end of the arm 69 is a link 67 having a slot 68 which embraces the shaft 51. A cam roller 66 is carried in the other end of the rod 67. The arm 50 extends upwardly past the shaft 51 and carries in its end a stub shaft, upon which shaft is fixed a cam 64 and a gear 63. A gear 62 meshes with said gear 63. Said gear 62 is fixed to a sleeve 61 loosely mounted on the shaft 51. Fixed to the sleeve 61 is a sprocket wheel 60 over which runs a sprocket chain 59, which also runs over a sprocket wheel 58, said sprocket wheel 58 being fixed on the shaft 11. A suitable spring 53ª serves to press the jaws together and also to keep the roller 66 to its cam 64. For the purpose of registering the signatures exactly, a stop 72 is shown mounted in the movable jaw 53 and working in an aperture in the jaw 52. The manner of operation of these signature-taking devices is substantially as follows: The eccentric 54, through the link 56 and arm 57, rocks the arm 50 to and fro. At the same time the sprocket train 58, 59 and 60, through the gears 62 and 63 rotates the cam 64 to open and close the gripper jaws 52 and 53 at the proper time. As the jaws swing up to the downwardly bent signature as shown in Fig. 1, the jaws close upon the signature 71, the stops 72 registering same. They then swing backwardly withdrawing the signature from the holder 25, dropping it upon the table 26 and at the same time releasing it. The signature is then fed forward as already described.

The embodied and illustrated form of stitching means comprises traveling stitchers, shown as two in number, 76 and 77, mounted to slide on a guide 82 and connected together by a frame 79. The stitcher anvils or clenchers 83 are carried on and travel with the sprocket chain 39, and are spaced to come beneath the stitcher just at the proper moment. They are spaced at proper distances along the chain 39 with respect to the fingers 38, which fingers position the inset signatures along the chain 39. When the clenchers are in operative position with the stitchers they slide along a support 84, which holds them firmly during the stitching operation. The stitchers are driven from a shaft 86, the splined bevel gears 87 and 88, connecting to the respective stitcher mechanisms, being splined upon said shaft to slide therealong but to rotate therewith. The stitchers are reciprocated to and fro in a suitable manner, and the embodied form of reciprocating means comprises a lever 90 pivoted at 91 and having a pin and slot connection 92 with the frame of the stitchers 76 and 77. Pivoted to the lever 90 is a link 93, the other end of which is provided with a yoke 94 about a shaft 95. A cam roll 96 upon the link 93 works in a cam groove 97 as the shaft 95 rotates, thus imparting the reciprocating action to the stitchers. The parts are so constructed proportioned and arranged that the stitchers will travel at the same speed with the inset signatures, as they are propelled along the saddle by the fingers 38 of the sprocket chain 39, whereby the moving stitchers and the moving signatures are relatively at rest during the stitching of the signatures together.

Means are provided for delivering the stitched pamphlets, and in the embodied form there is shown at the end of the saddle a blade or support 98 carried upon posts 99. Adjacent thereto is a cylinder 100 carried upon a shaft 101. Mounted upon the cylinder 100 is a gripper shaft 102 carrying grippers 103 which are acted upon by springs 104. Mounted upon said gripper shaft 102 is a pinion 105 in mesh with a geared sector 106 pivoted upon a stub shaft 107 on the end of the cylinder 100. Fixed to the sector 106 is an arm 108 having a cam roll 109 working in a cam groove 111 in the cam plate 110. This cam groove is so formed that the grippers 103 will open and close to grip and release the sheets at the point of taking and delivery, respectively. Above the cylinder 100 is shown a series of bars 112 and at the end thereof a roller 113. Working above the bars 112 are a series of tapes 114 running over rollers 115 and 116. A suitable receptacle 117 is provided, of any convenient form, for the stitched magazines.

After the magazines have been stitched by the mechanism just described, and while still traveling, they are pushed along onto the blade 98 by the fingers 38 which then pass out of engagement with the pamphlet. The stitched pamphlet is now hanging on the blade 98, and as the cylinder 100 rotates the grippers 103 close down upon the folded and stitched edge of the pamphlet carrying it away as the cylinder rotates. As the folded edge of the magazine comes to the bars 112, the gripper fingers 103 open and the stitched and folded pamphlet is stripped off the cylinder by bars 112 and is progressed by the tapes 114 and delivered into the receptacle 117.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A book or pamphlet making machine including in combination a plurality of signature opening devices, means for moving opened signatures to bring together opened signatures from a plurality of said opening devices and insetting one within another, and traveling stitching means moving at substantially the same speed as the inset signatures for stitching said signatures together while open and while being moved by said moving means.

2. A book or pamphlet making machine including in combination a plurality of signature opening devices, means for moving opened signatures to bring together opened signatures from a plurality of said opening devices and insetting one within another, traveling stitching means moving at substantially the same speed as the inset signatures for stitching said signatures together while open and while being moved by said moving mean, and means for folding said stitched signatures together.

3. A book or pamphlet making machine including in combination a plurality of signature opening devices, means for progressing a signature opened by one of said devices past another of said opening devices, whereby said signature an another opened signature from said other opening device are brought together and one inset within the other, and a traveling stitching device for stitching said signatures together while they are being progressed, open and inset, by said progressing means.

4. A book or pamphlet making machine including in combination a plurality of signature opening devices, means for progressing a signature opened by one of said devices past another of said opening devices, whereby said signature and another opened signature from said other opening device are brought together and one inset within the other, and traveling stitching means for stitching said signatures together while they are being progressed, open and inset, by said progressing means.

5. A book or pamphlet making machine including in combination a plurality of signature opening devices, means for progressing a signature opened by one of said devices past another of said opening devices, whereby said signature and another opened signature from said other opening device are brought together and one inset within the other, and traveling stitching means for stitching said signatures together from the back through to the inside while they are being progressed, open and inset, by said progressing means.

6. A book or pamphlet making machine including in combination means for opening a signature and delivering it partly open with the back above, means for conveying said partly opened signature past another opening and delivering means, means for partly opening another signature and delivering it about said first mentioned signature, means for stitching the opened and inset signatures together while conveyed upon said conveying means, said stitching means traveling in the same direction and at the same speed with the signatures while they are being stitched.

7. A book or pamphlet making machine including in combination means for opening a signature and delivering it partly open with the back above, means for conveying said partly opened signature past another opening and delivering means, means for partly opening another signature and delivering it about said first mentioned signature, means for stitching the opened and inset signatures together from the back through to the inside while conveyed upon said conveying means, said stitching means traveling in the same direction and at the same speed with the signatures while they are being stitched.

8. A book or pamphlet making machine including in combination signature conveying means, means for opening the signature and dropping it open upon said conveying means, means for opening another signature and dropping it open upon said first mentioned signature as it is conveyed past said second opening means, whereby the signatures are inset, and means traveling with said signatures along said conveyer for stitching the signatures together while being conveyed partly open upon said conveyer.

9. A book or pamphlet making machine including in combination signature conveying means, means for opening the signature and dropping it open upon said conveying means, means for opening another signature and dropping it open upon said first mentioned signature as it is conveyed past said second opening means, whereby the signatures are inset, and means traveling with said signatures along said conveyer for stitching the signatures together from the back through to the inside while being conveyed partly open upon said conveyer.

10. A book or pamphlet making machine including in combination signature conveying means, means for opening the signature and dropping it open upon said conveying means, means for opening another signature and dropping it open upon said first mentioned signature as it is conveyed past said second opening means, whereby the signatures are inset, means traveling with said signatures along said conveyer for stitching the signatures together while being conveyed partly open upon said conveyer, and folding means to which said inset and stitched signatures are conveyed by said conveying means.

11. A book or pamphlet making machine including in combination horizontally arranged conveying means, signature opening means arranged above said conveying means for opening a signature and dropping it open upon said conveying means, other signature opening means arranged above said conveyer for opening a signature and dropping it upon said first-mentioned opened signature whereby they are inset, and stitching means traveling along said conveying means for stitching said inset signatures together while being conveyed partly open upon said conveyer.

12. A book or pamphlet making machine including in combination horizontally arranged conveying means, signature opening means arranged above said conveying means for opening a signature and dropping it open upon said conveying means, other signature opening means arranged above said conveyer for opening a signature and dropping it upon said first-mentioned opened signature whereby they are inset, stitching means traveling along said conveying means for stitching said inset signatures together while being conveyed, and folding means to which said inset and stitched signatures are conveyed by said conveying means.

13. A book or pamphlet making machine including in combination a horizontally arranged saddle, and means for conveying opened signatures therealong, a signature opening device arranged above said saddle to open a signature and drop it open upon said saddle, another signature opening device arranged to open a signature and drop it open upon said first mentioned opened signature upon said saddle, whereby they are inset, traveling stitching means located partly above and partly below said saddle for stitching said inset signatures together while being conveyed along said saddle.

14. A book or pamphlet making machine including in combination a horizontally arranged saddle, and means for conveying opened signatures therealong, a signature opening device arranged above said saddle to open a signature and drop it open upon said saddle, another signature opening device arranged to open a signature and drop it open upon said first-mentioned opened signature upon said saddle, whereby they are inset, traveling stitching means located partly above and partly below said saddle for stitching said inset signatures together while being conveyed along said saddle, and folding means to which said inset and stitched signatures are conveyed from said saddle.

15. A book or pamphlet making machine including in combination means for opening and insetting signatures, means for conveying the inset and opened signatures, traveling stitching means for stitching the signatures together while so inset, rotary folding means for folding the inset and stitched signatures, and means for presenting the stitched signatures to said folding means to be taken thereby.

16. A book or pamphlet making machine including in combination a plurality of sources of supply for folded signatures, means for opening and insetting together the signatures from said sources of supply, a saddle along which the inset signatures are conveyed, a rotary folding cylinder provided with grippers, and means for receiving said inset signatures from said saddle and positioning them to be taken by the grippers on said folding cylinder.

17. A book or pamphlet making machine including in combination a plurality of sources of supply for folded signatures, means for opening and insetting together the signatures from said sources of supply, a saddle along which the inset signatures are conveyed, a rotary folding cylinder provided with grippers, means for receiving said inset signatures from said saddle and positioning them to be taken by the grippers on said folding cylinder and delivery means for receiving the folded signature from said cylinder.

18. A book or pamphlet making machine including in combination a horizontally arranged saddle, a plurality of devices for supporting signatures, opening means arranged along said saddle for opening signatures and dropping them upon said saddle, means for progressing said signatures along said saddle, a horizontal blade at the end of said saddle to which the inset signatures are conveyed from the saddle, and a rotary cylinder arranged alongside said blade and having grippers adapted to grip the back edge of the inset signatures as they rest upon said blade.

19. A book or pamphlet making machine including in combination a horizontally arranged saddle, a plurality of devices for supporting signatures, opening means arranged along said saddle for opening signatures and dropping them upon said saddle, means for progressing said signatures along said saddle, a horizontal blade at the end of said saddle to which the inset signatures are conveyed from the saddle, and a rotary cylinder arranged alongside said blade and having grippers adapted to grip the back edge of the inset signatures as they rest upon said blade, and delivery means for receiving the folded signatures from said cylinder.

In testimony whereof, I have signed my name to this specification, in the presence of two subscribing witnesses.

CHARLES GITZENDANNER.

Witnesses:
JOHN D. MORGAN,
ROSE MENK.